(12) United States Patent
Shoudai et al.

(10) Patent No.: US 7,244,523 B2
(45) Date of Patent: Jul. 17, 2007

(54) MAGNETIC TAPE AND METHOD FOR MANUFACTURING THE SAME

(75) Inventors: Sadayuki Shoudai, Tokyo (JP); Tsutomu Kikuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 209 days.

(21) Appl. No.: 10/802,134

(22) Filed: Mar. 16, 2004

(65) Prior Publication Data

US 2004/0185292 A1    Sep. 23, 2004

(30) Foreign Application Priority Data

Mar. 20, 2003  (JP)  ............................. 2003-078533

(51) Int. Cl.
G11B 5/66    (2006.01)
(52) U.S. Cl. ...................................... 428/846
(58) Field of Classification Search ................ 428/838, 428/846, 845.5; 83/496, 497
See application file for complete search history.

(56) References Cited

U.S. PATENT DOCUMENTS

| | | | | |
|---|---|---|---|---|
| 5,873,293 | A | * | 2/1999 | Yamazaki ..................... 83/497 |
| 2003/0188612 | A1 | * | 10/2003 | Kobayashi et al. ............. 83/13 |
| 2004/0173069 | A1 | * | 9/2004 | Shoudai et al. ................. 83/13 |

FOREIGN PATENT DOCUMENTS

| | | | |
|---|---|---|---|
| JP | 62-202385 | * | 9/1987 |
| JP | 09-153212 | | 6/1997 |
| JP | 11-296839 | | 10/1999 |

OTHER PUBLICATIONS

Machine translation of JP 11-296839, Oct. 1999.*

* cited by examiner

*Primary Examiner*—Holly Rickman
(74) *Attorney, Agent, or Firm*—Seed IP Law Group PLLC

(57) ABSTRACT

A method for manufacturing a magnetic tape includes a step of setting a cutting start angle between the disk-like upper blade and the disk-like lower blade overlapping each other and rotating in opposite directions at the time that cutting of the broad magnetic tape fed to a portion between the upper blade and the lower blade by the upper blade and the lower blade is started so that a position where an irregular raised and depressed pattern of a cut surface of the support on the side of the upper blade to be formed becomes locally maximal or a position where an irregular raised and depressed pattern of a cut surface of the support on the side of the lower blade becomes locally maximal satisfies $40 \leq 100BU/T \leq 70$ or $40 \leq 100BL/T \leq 70$, where BU is the distance from the surface of the back coat layer to the position where the irregular raised and depressed pattern of the cut surface of the support on the side of the upper blade becomes locally maximal, BL is the distance from the surface of the back coat layer to the position where the irregular raised and depressed pattern of the cut surface of the support on the side of the lower blade becomes locally maximal and T is the total thickness of the broad magnetic tape, and cutting the broad magnetic tape, thereby manufacturing the magnetic tape.

4 Claims, 6 Drawing Sheets

MAGNETIC TAPE AND METHOD FOR MANUFACTURING THE SAME

BACKGROUND OF THE INVENTION

The present invention relates to a magnetic tape and a method for manufacturing a magnetic tape and, particularly, to a magnetic tape and a method for manufacturing a magnetic tape which can effectively prevent a part of a cut surface of a magnetic tape obtained by feeding a broad magnetic tape to a portion between a disk-like upper blade and a disk-like lower blade overlapping each other and rotating in the opposite directions and cutting it along the longitudinal direction thereof from peeling off and dropping from the cut surface of the magnetic tape due to an irregular raised and depressed pattern of the cut surface of the magnetic tape when data are recorded in the magnetic tape or data are reproduced from the magnetic tape.

DESCRIPTION OF THE PRIOR ART

Usually, a magnetic tape is manufactured by forming a magnetic recording layer on one surface of a broad support, forming a back coat layer on the other surface thereof to form a broad magnetic tape, and feeding the broad magnetic tape to a portion between a rotating upper blade and lower blade of a cutting device, thereby cutting the broad magnetic tape into magnetic tapes having a width equal to that of a product.

However, it is known that in the case where a magnetic tape is manufactured by feeding a broad magnetic tape to a portion between a disk-like upper blade and a disk-like lower blade overlapping each other and rotating in the opposite directions and cutting it into magnetic tapes having a width equal to that of a product, an irregular raised and depressed pattern tends to be generated on the cut surface of the magnetic tape. In the case where the irregular raised and depressed pattern is generated on the cut surface of the magnetic tape, the cut surface of the magnetic tape, which is used as a guide surface, is guided by guide members of a data recording apparatus when data are recorded in the magnetic tape, and the cut surface of the magnetic tape is guided by guide members of a data reproducing apparatus when data are reproduced from the magnetic tape. Therefore, there is some risk of a part of the cut surface peeling off and dropping from the cut surface of the magnetic tape.

In order to prevent such trouble from occurring and to manufacture a magnetic tape by cutting a broad magnetic tape so as to diminish the irregular raised and depressed pattern generated on the cut surface thereof, it has been proposed to adjust the degree of overlap between a disk-like upper blade and a disk-like lower blade for cutting the broad magnetic tape or chamfer the upper blade or the lower blade.

According to these methods, it is possible to diminish the irregular raised and depressed pattern of the cut surface of a magnetic tape to some extent. However, since the degree of overlap between the disk-like upper blade and the disk-like lower blade set in order to improve the irregular raised and depressed pattern of the cut surface of a magnetic tape depends upon the diameters of the disk-like upper blade and the disk-like lower blade, it is indispensable to experimentally determine the degree of overlap between the disk-like upper blade and the disk-like lower blade in accordance with the diameters of the disk-like upper blade and the disk-like lower blade. It is impossible to sufficiently diminish the irregular raised and depressed pattern of the cut surface of a magnetic tape only by chamfering the upper blade or the lower blade. Therefore, it is required to develop a method for effectively preventing a part of the cut surface from dropping from the cut surface of the magnetic tape due to the irregular raised and depressed pattern of the cut surface of a magnetic tape.

SUMMARY OF THE INVENTION

It is therefore an object of the present invention to provide a magnetic tape and a method for manufacturing a magnetic tape which can effectively prevent a part of cut surfaces of a magnetic tape obtained by feeding a broad magnetic tape to a portion between a disk-like upper blade and a disk-like lower blade overlapping each other and rotating in the opposite directions and cutting it along the longitudinal direction thereof from peeling off and dropping from the cut surfaces of the magnetic tape due to irregular raised and depressed patterns of the cut surfaces of the magnetic tape when data are recorded in the magnetic tape or data are reproduced from the magnetic tape.

The inventors of the present invention vigorously pursued a study for accomplishing the above objects and, as a result, made the surprising discovery that in the case where the position where an irregular raised and depressed pattern of a cut surface of a support of a magnetic tape on the side of the upper blade obtained by cutting a broad magnetic tape using the upper blade and the lower blade became locally maximal or the position where an irregular raised and depressed pattern of a cut surface of the support of the magnetic tape on the side of the lower blade became locally maximal satisfied $40 \leq 100 BU/T \leq 70$ or $40 \leq 100 BL/T \leq 70$, where BU was the distance from the surface of the back coat layer to the position where the irregular raised and depressed pattern of the cut surface of the support on the side of the upper blade became locally maximal, BL was the distance from the surface of the back coat layer to the position where the irregular raised and depressed pattern of the cut surface of the support on the side of the lower blade became locally maximal and T was the total thickness of the broad magnetic tape, the position where the irregular raised and depressed pattern of the cut surface of the support on the side of the upper blade became locally maximal and the position where the irregular raised and depressed pattern of the cut surface of the support on the side of the lower blade became locally maximal substantially coincided with each other in the thickness direction of the magnetic tape and as a result, it was possible to abut both cut surfaces of the support in a similar manner against guide members of a data recording apparatus or guide members of a data reproducing apparatus when both cut surfaces of the magnetic tape were guided by the guide members of the data recording apparatus for recording data in the magnetic tape or both cut surfaces of the magnetic tape were guided by the guide members of the data reproducing apparatus for reproducing data from the magnetic tape and thus to enable the magnetic tape to run stably, whereby it was possible to effectively prevent a part of the cut surfaces of the magnetic tape from peeling off and dropping from the cut surfaces due to the irregular raised and depressed patterns of the cut surfaces of the magnetic tape when data were recorded or data were reproduced, even if the irregular raised and depressed patterns were formed on the cut surfaces of the magnetic tape.

In a study done of the inventors of the present invention, it was found that in the case where the position where an irregular raised and depressed pattern of a cut surface of a support of a magnetic tape on the side of the upper blade obtained by cutting a broad magnetic tape using the disk-like upper blade and the disk-like lower blade overlapping each other and rotating in opposite directions became locally maximal or the position where an irregular raised and depressed pattern of a cut surface of the support of the magnetic tape became locally maximal was such that 100BU/T<40 or 100BL/T<40, or in the case where the position where the irregular raised and depressed pattern of the cut surface of the support of the magnetic tape on the side of the upper blade became locally maximal or the position where the irregular raised and depressed pattern of the cut surface of the support of the magnetic tape on the side of the lower blade became locally maximal was such that 100BU/T>70 or 100BL/T>70, the position where the irregular raised and depressed pattern of the cut surface of the support of the magnetic tape on the side of the upper blade became locally maximal and the position where the irregular raised and depressed pattern of the cut surface of the support of the magnetic tape on the side of the lower blade became locally maximal greatly deviated from each other in the thickness direction of the magnetic tape and it was therefore impossible to abut both cut surfaces of the support in a similar manner against guide members of a data recording apparatus or guide members of a data reproducing apparatus when both cut surfaces of the magnetic tape were guided by the guide members of the data recording apparatus for recording data in the magnetic tape or both cut surfaces of the magnetic tape were guided by the guide members of the data reproducing apparatus for reproducing data from the magnetic tape and to enable the magnetic tape to run stably, whereby there arose a problem of projected portions of both cut surfaces of the magnetic tape peeling off and dropping from the cut surfaces due to the contact of guide members of a data recording apparatus or guide members of a data reproducing apparatus with both cut surfaces of the magnetic tape.

Therefore, the above and other objects of the present invention can be accomplished by a magnetic tape which is manufactured by feeding a broad magnetic tape including a broad support, a magnetic recording layer formed on one surface of the support and a back coat layer formed on the other surface of the support to a portion between a disk-like upper blade and a disk-like lower blade overlapping each other and rotating in opposite directions and cutting it into magnetic tapes each having a predetermined width and in which a position where an irregular raised and depressed pattern of a cut surface of the support on the side of the upper blade becomes locally maximal or a position where an irregular raised and depressed pattern of a cut surface of the support on the side of the lower blade becomes locally maximal satisfies $40 \leq 100BU/T \leq 70$ or $40 \leq 100BL/T \leq 70$, where BU is the distance from the surface of the back coat layer to the position where the irregular raised and depressed pattern of the cut surface of the support on the side of the upper blade becomes locally maximal, BL is the distance from the surface of the back coat layer to the position where the irregular raised and depressed pattern of the cut surface of the support on the side of the lower blade becomes locally maximal and T is the total thickness of the broad magnetic tape.

In this specification, a "cut surface of a magnetic tape on the side of an upper blade" means a cut surface of the magnetic tape in contact with the upper blade after a broad magnetic tape is cut and a "cut surface of a magnetic tape on the side of a lower blade" means a cut surface of the magnetic tape in contact with the lower blade after a broad magnetic tape is cut.

In a study done by the inventors of the present invention, it was found that in the case where the position where an irregular raised and depressed pattern of a cut surface of a support of a magnetic tape on the side of the upper blade obtained by cutting a broad magnetic tape using a disk-like upper blade and a disk-like lower blade overlapping each other and rotating in opposite directions became locally maximal and the position where an irregular raised and depressed pattern of a cut surface of the support of the magnetic tape became locally maximal assumed a relationship wherein the ratio of BU/T to BL/T was smaller than 0.9 or the ratio of BU/T to BL/T exceeded 1.1, it was difficult to abut both cut surfaces of the support in a similar manner against guide members of a data recording apparatus or guide members of a data reproducing apparatus when both cut surfaces of the magnetic tape were guided by the guide members of the data recording apparatus for recording data in the magnetic tape or both cut surfaces of the magnetic tape were guided by the guide members of the data reproducing apparatus for reproducing data from the magnetic tape and to enable the magnetic tape to run stably and as a result, there arose a problem of projected portions of both cut surfaces of the magnetic tape peeling off and dropping from the cut surfaces due to the contact of guide members of a data recording apparatus or guide members of a data reproducing apparatus with both cut surfaces of the magnetic tape.

To the contrary, in a further study done by the inventors of the present invention, it was found that in the case where the position where an irregular raised and depressed pattern of a cut surface of a support of a magnetic tape on the side of the upper blade obtained by cutting a broad magnetic tape using a disk-like upper blade and a disk-like lower blade overlapping each other and rotating in opposite directions became locally maximal and the position where an irregular raised and depressed pattern of a cut surface of the support of the magnetic tape became locally maximal satisfied the relationship that a ratio of BU/T to BL/T was 0.9 to 1.1, it was possible to abut both cut surfaces of the support in a similar manner against guide members of a data recording apparatus or guide members of a data reproducing apparatus when both cut surfaces of the magnetic tape were guided by the guide members of the data recording apparatus for recording data in the magnetic tape or both cut surfaces of the magnetic tape were guided by the guide members of the data reproducing apparatus for reproducing data from the magnetic tape and thus to enable the magnetic tape to run stably, whereby it was possible to reliably prevent a part of the cut surfaces of the magnetic tape from peeling off and dropping from the cut surfaces due to the irregular raised and depressed patterns of the cut surfaces of the magnetic tape when data were recorded or data were reproduced, even if the irregular raised and depressed patterns were formed on the cut surfaces of the magnetic tape.

In a preferred aspect of the present invention, the ratio of BU/T to BL/T is equal to or larger than 0.9 and equal to or smaller than 1.1.

In a further study done by the inventors of the present invention, it was surprisingly found that the irregular raised and depressed patterns of the cut surfaces of the magnetic tape could be controlled by controlling a cutting start angle between the disk-like upper blade and the disk-like lower blade overlapping each other and rotating in opposite directions at the time that cutting of the broad magnetic tape fed to a portion therebetween was started so that the position where the irregular raised and depressed pattern of the cut surface of the support on the side of the upper blade became locally maximal and the position where the irregular raised and depressed pattern of the cut surface of the support on the side of the lower blade became locally maximal substantially coincided with each other in the thickness direction of the magnetic tape.

Therefore, the above and other objects of the present invention can be also accomplished by a method for manufacturing a magnetic tape comprising steps of feeding a broad magnetic tape including a broad support formed with a magnetic recording layer on one side thereof and a back coat layer on the other surface thereof to a portion between a disk-like upper blade and a disk-like lower blade overlapping each other and rotating in opposite directions and cutting the broad magnetic tape into magnetic tapes each having a predetermined width, which method for manufacturing a magnetic tape further comprises a step of setting a cutting start angle between the disk-like upper blade and the disk-like lower blade overlapping each other and rotating in opposite directions at the time that cutting of the broad magnetic tape fed to a portion between the upper blade and the lower blade by the upper blade and the lower blade is started so that a position where an irregular raised and depressed pattern of a cut surface of the support on the side of the upper blade to be formed by cutting the broad magnetic tape using the upper blade and the lower blade becomes locally maximal or a position where an irregular raised and depressed pattern of a cut surface of the support on the side of the lower blade becomes locally maximal satisfies $40 \leq 100BU/T \leq 70$ or $40 \leq 100BL/T \leq 70$, where BU is the distance from the surface of the back coat layer to the position where the irregular raised and depressed pattern of the cut surface of the support on the side of the upper blade becomes locally maximal, BL is the distance from the surface of the back coat layer to the position where the irregular raised and depressed pattern of the cut surface of the support on the side of the lower blade becomes locally maximal and T is the total thickness of the broad magnetic tape, and cutting the broad magnetic tape, thereby manufacturing the magnetic tape.

In a preferred aspect of the present invention, the cutting start angle between the disk-like upper blade and the disk-like lower blade overlapping each other and rotating in opposite directions at the time that cutting of the broad magnetic tape fed to a portion between the upper blade and the lower blade by the upper blade and the lower blade is started is set so that the ratio of BU/T to BL/T is equal to or larger than 0.9 and equal to or smaller than 1.1, thereby cutting the broad magnetic tape to manufacture the magnetic tape.

In a preferred aspect of the present invention, the cutting start angle between the disk-like upper blade and the disk-like lower blade overlapping each other and rotating in opposite directions at the time that cutting of the broad magnetic tape fed to a portion therebetween is started is set to be 7 degrees to 12 degrees and the broad magnetic tape is cut, thereby manufacturing the magnetic tape.

In a study done by the inventors of the present invention, it was found that in the case where the broad magnetic tape was cut by setting the cutting start angle between the disk-like upper blade and the disk-like lower blade overlapping each other and rotating in opposite directions at the time that cutting of the broad magnetic tape fed to a portion therebetween was started to be smaller than 7 degrees, thereby manufacturing the magnetic tape, or the broad magnetic tape was cut by setting the cutting start angle to be larger than 12 degrees, thereby manufacturing the magnetic tape, the position where the irregular raised and depressed pattern of the cut surface of the support of the thus manufactured magnetic tape on the side of the upper blade became locally maximal and the position where the irregular raised and depressed pattern of the cut surface of the support of the magnetic tape on the side of the lower blade became locally maximal greatly deviated from each other in the thickness direction of the magnetic tape and that it was therefore impossible to abut both cut surfaces of the support in a similar manner against guide members of a data recording apparatus or guide members of a data reproducing apparatus when both cut surfaces of the magnetic tape were guided by the guide members of the data recording apparatus for recording data in the magnetic tape or both cut surfaces of the magnetic tape were guided by the guide members of the data reproducing apparatus for reproducing data from the magnetic tape and to enable the magnetic tape to run stably, whereby there arose a problem of projected portions of both cut surfaces of the magnetic tape peeling off and dropping from the cut surfaces due to the contact of guide members of a data recording apparatus or guide members of a data reproducing apparatus with both cut surfaces of the magnetic tape.

To the contrary, in a study done by the inventors of the present invention, it was surprisingly found that in the case where the broad magnetic tape was cut by setting the cutting start angle between the disk-like upper blade and the disk-like lower blade overlapping each other and rotating in opposite directions at the time that cutting of the broad magnetic tape fed to a portion therebetween was started to be 7 degrees to 12 degrees, thereby manufacturing the magnetic tape, the position where the irregular raised and depressed pattern of the cut surface of the support on the side of the upper blade became locally maximal and the position where the irregular raised and depressed pattern of the cut surface of the support on the side of the lower blade became locally maximal substantially coincided with each other in the thickness direction of the magnetic tape and as a result, it was possible to abut both cut surfaces of the support in a similar manner against guide members of a data recording apparatus or guide members of a data reproducing apparatus when both cut surfaces of the magnetic tape were guided by the guide members of the data recording apparatus for recording data in the magnetic tape or both cut surfaces of the magnetic tape were guided by the guide members of the data reproducing apparatus for reproducing data from the magnetic tape and thus to enable the magnetic tape to run stably, whereby it was possible to effectively prevent a part of the cut surfaces of the magnetic tape from peeling off and dropping from the cut surfaces due to the irregular raised and depressed patterns of the cut surfaces of the magnetic tape when data were recorded or data were reproduced, even if the irregular raised and depressed patterns were formed on the cut surfaces of the magnetic tape.

In a further preferred aspect of the present invention, the cutting start angle between the disk-like upper blade and the disk-like lower blade overlapping each other and rotating in opposite directions at the time that cutting of the broad magnetic tape fed to a portion therebetween is started is set to be 7 degrees to 10 degrees and the broad magnetic tape is cut, thereby manufacturing the magnetic tape.

In a study done by the inventors of the present invention, it was surprisingly found that in the case where the broad magnetic tape was cut by setting the cutting start angle between the disk-like upper blade and the disk-like lower blade overlapping each other and rotating in opposite directions at the time that cutting of the broad magnetic tape fed to a portion therebetween was started to be 7 degrees to 10 degrees, thereby manufacturing the magnetic tape, the position where the irregular raised and depressed pattern of the cut surface of the support on the side of the upper blade became locally maximal and the position where the irregular raised and depressed pattern of the cut surface of the support on the side of the lower blade became locally maximal were extremely close to each other in the thickness direction of the magnetic tape and as a result, it was possible to abut both cut surfaces of the support in a similar manner against guide members of a data recording apparatus or guide members of a data reproducing apparatus when both cut surfaces of the magnetic tape were guided by the guide members of the data recording apparatus for recording data in the magnetic tape or both cut surfaces of the magnetic tape were guided by the guide members of the data reproducing apparatus for reproducing data from the magnetic tape and thus to enable the magnetic tape to run very stably, whereby it was possible to reliably prevent a part of the cut surfaces of the magnetic tape from peeling off and dropping from the cut surfaces due to the irregular raised and depressed patterns of the cut surfaces of the magnetic tape when data were recorded or data were reproduced, even if the irregular raised and depressed patterns were formed on the cut surfaces of the magnetic tape.

In the present invention, the surface of the upper blade facing the lower blade may be chamfered but need not be chamfered.

In the present invention, the kind of a magnetic recording tape is not particularly limited and illustrative examples include a computer data back-up tape, a magnetic tape for audio recording, a magnetic tape for video recording, an 8 mm magnetic tape for video recording and the like. The magnetic tape may include a single magnetic recording layer or a plurality of magnetic recording layers.

In the present invention, the magnetic tape includes a support, one or more magnetic recording layers formed on one surface of the support and a back coat layer formed on the other surface of the support. However, the magnetic tape may further include an undercoat layer between the magnetic recording layer and the support for improving adhesiveness between the magnetic recording layer and the support.

In a preferred aspect of the present invention, the magnetic tape is constituted as a computer data back-up tape.

The above and other objects and features of the present invention will become apparent from the following description made with reference to the accompanying drawings.

DESCRIPTION OF THE PREFERRED EMBODIMENTS

Figure 1:
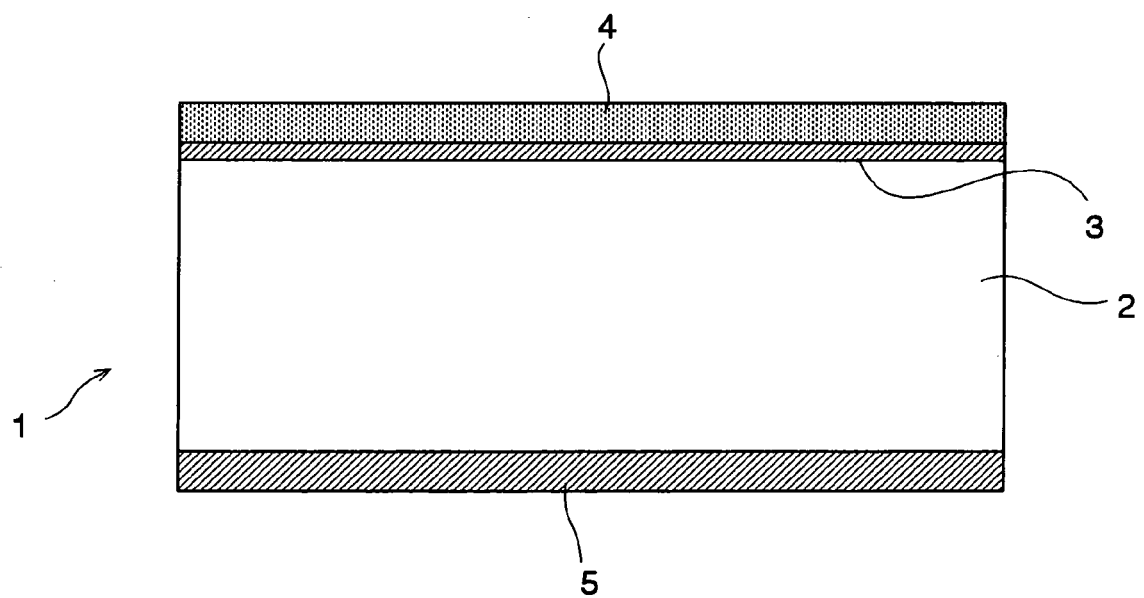
FIG. 1 is a schematic cross-sectional view showing a magnetic tape manufactured by ideally cutting a broad magnetic tape in the longitudinal direction thereof.

FIG. 1 is a schematic cross-sectional view showing a magnetic tape manufactured by ideally cutting a broad magnetic tape in the longitudinal direction thereof.

A magnetic tape 1 is constituted as a computer data back-up tape 1. As shown in FIG. 1, the computer data back-up tape 1 includes a support 2, and an undercoat layer 3 and a magnetic recording layer 4 for recording data therein are formed on one surface of the support 2 and a back coat layer 5 is formed on the other surface of the support 2.

In this embodiment, the support 2 of the computer data back-up tape 1 has a thickness of 6.0 to 6.5 μm, preferably 6.1 to 6.3 μm. On the one surface of the support 2, the undercoat layer 3 having a thickness of 0.5 to 2.5 μm and the magnetic recording layer 4 having a thickness of 0.05 to 0.5 μm are formed and on the other surface of the support 2, the back coat layer 5 having a thickness of 0.4 to 0.7 μm is formed.

The computer data back-up tape 1 shown in FIG. 1 is manufactured by forming the undercoat layer 3 and the magnetic recording layer 4 on one surface of a broad support 2 using a coating process or the like, forming the back coat layer 5 on the other surface of the broad support 2 using a coating process or the like, to form a broad magnetic tape (not shown), and cutting the broad magnetic tape in the longitudinal direction thereof so that each computer data back-up tape 1 has a predetermined width.

Figure 2:
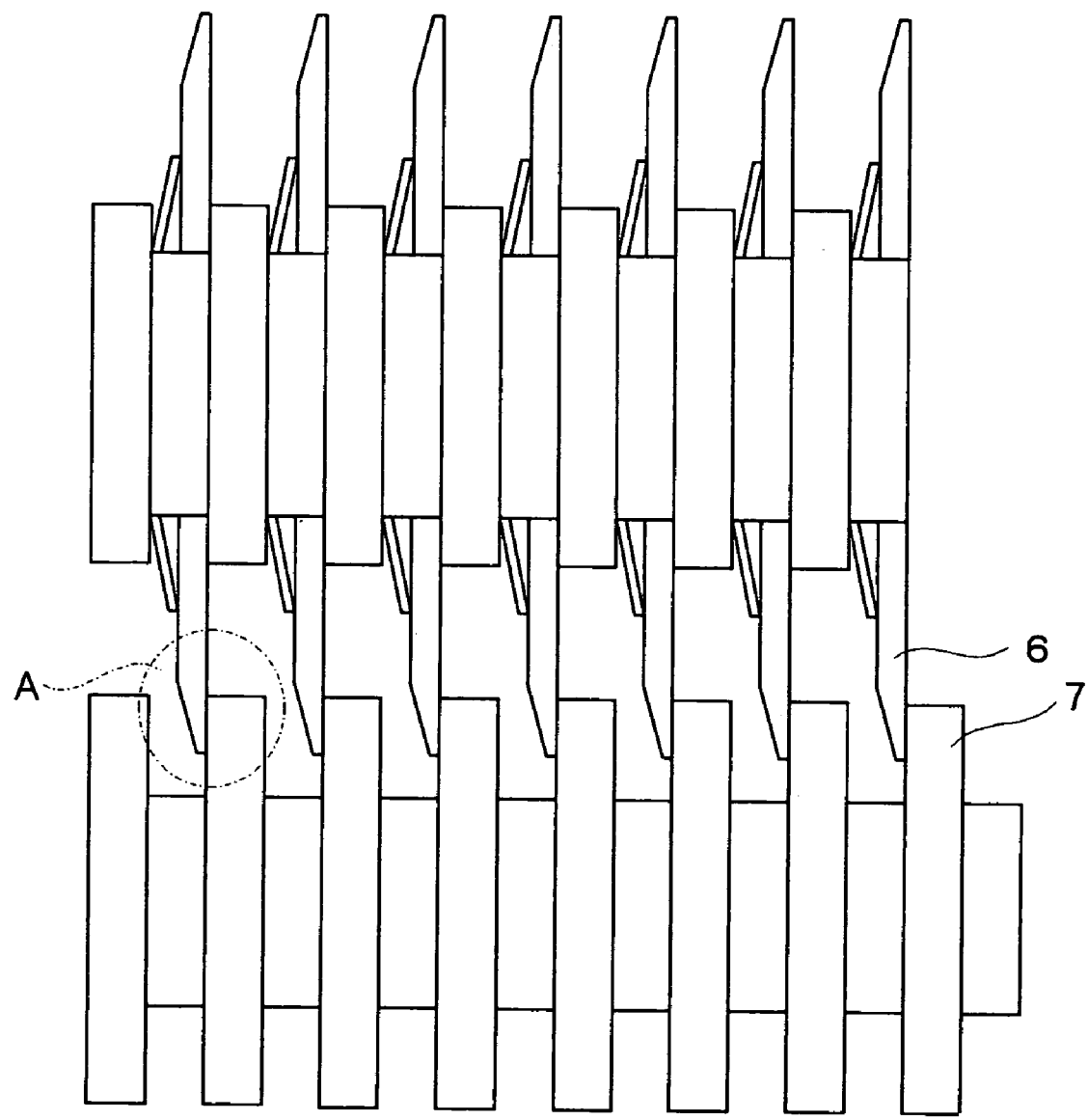
FIG. 2 is a schematic lateral cross-sectional view showing a magnetic tape cutting device that is a preferred embodiment of the present invention.
Figure 3:
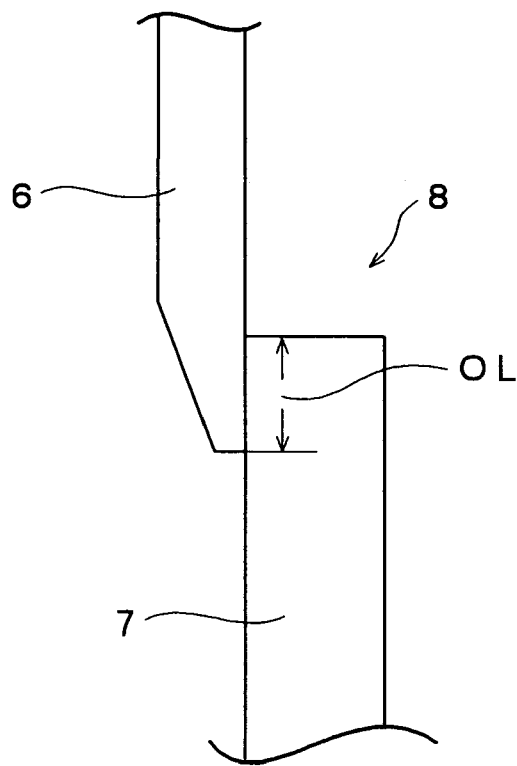
FIG. 3 is a schematic enlarged partial cross-sectional view of a portion indicated by A in FIG. 2.

FIG. 2 is a schematic lateral cross-sectional view showing a magnetic tape cutting device that is a preferred embodiment of the present invention and FIG. 3 is a schematic enlarged partial cross-sectional view of a portion indicated by A in FIG. 2.

As shown in FIG. 2, a magnetic tape cutting device according to this embodiment is constituted so as to cut a broad magnetic tape (not shown) including a support 2 having a thickness of about 6.2 μm, an undercoat layer 3 having a thickness of about 2 μm and a magnetic recording layer 4 having a thickness of about 0.15 μm formed on one surface of the support 2, and a back coat layer 5 having a thickness of about 0.5 μm formed on the other surface of the support 2 into magnetic tapes each having a predetermined width, thereby manufacturing a computer data back-up tape 1 and includes a plurality of cutting units 8 each provided with a disk-like upper blade 6 and a disk-like lower blade 7 which are constituted to be rotatable.

As shown in FIG. 3, in this embodiment, as the upper blade 6, there is used a blade whose surface facing the lower blade 7 is substantially parallel with the surface of the lower blade 7 facing the upper blade 6 and whose surface opposite from the surface facing the lower blade 7 is an inclined surface formed so that the thickness of the upper blade 6 gradually decreases toward its tip end portion.

In FIG. 3, OL designates the length of a region where the upper blade 6 and the lower blade 7 overlap.

Figure 4:
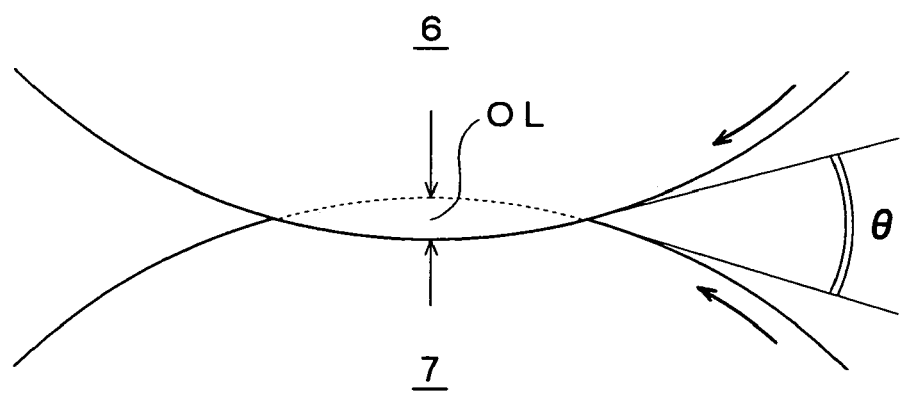
FIG. 4 is a longitudinal cross-sectional view showing one of the cutting units constituting the magnetic tape cutting device shown in FIG. 1.

FIG. 4 is a longitudinal cross-sectional view showing one of the cutting units 8 constituting the magnetic tape cutting device shown in FIG. 1.

As shown in FIG. 4, in each of the cutting units 8 constituting the magnetic tape cutting device according to this embodiment, the disk-like upper blade 6 and the disk-like lower blade 7 are rotated in opposite directions to each other and the broad magnetic tape is fed to a portion between the disk-like upper blade 6 and the disk-like lower blade 7 in such a manner that the magnetic layer 4 is located on the side of the upper blade 6 and the back coat layer 5 is located on the side of the lower blade 7, whereby the broad magnetic tape is cut by the upper blade 6 and the lower blade 7 of neighboring cutting units 8 constituting the magnetic tape cutting device into magnetic tapes each having a predetermined width, thereby manufacturing a computer data back-up tape 1.

Figure 5:
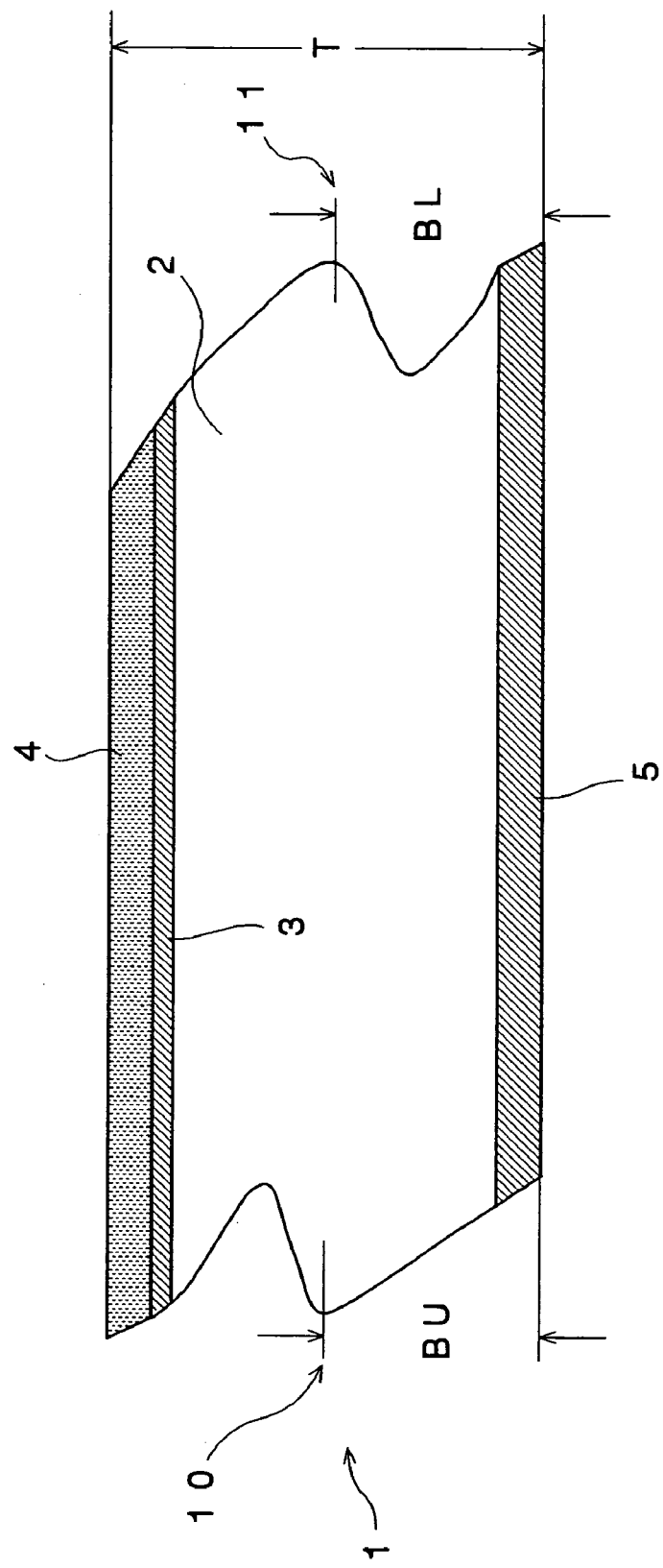
FIG. 5 is a schematic lateral cross-sectional view showing a computer data back-up tape produced by cutting a broad magnetic tape into magnetic tapes each having a predetermined width.

FIG. 5 is a schematic lateral cross-sectional view showing the computer data back-up tape 1 produced by cutting the broad magnetic tape into magnetic tapes each having a predetermined width.

As shown in FIG. 5, the cut surface of the support 2 of the computer data back-up tape 1 produced by cutting the broad magnetic tape into magnetic tapes each having a predetermined width on the side of the upper blade 6 has an irregular raised and depressed pattern and has an upper blade side projection portion 10 where the irregular raised and depressed pattern becomes locally maximal. On the other hand, the cut surface of the support 2 of the computer data back-up tape 1 on the side of the lower blade 7 has an irregular raised and depressed pattern and has a lower blade side projection portion 11 where the irregular raised and depressed pattern becomes locally maximal.

When data are to be recorded in the magnetic recording layer 4 of the computer data back-up tape 1, the computer data back-up tape 1 is fed in the data recording apparatus, while both side surfaces, namely, both cut surfaces of the computer data back-up tape 1, are guided by guide members of the data recording apparatus. On the other hand, when data recorded in the magnetic recording layer 4 of the computer data back-up tape 1 are to reproduced, the computer data back-up tape 1 is fed in the data recording apparatus with both cut surfaces of the computer data back-up tape 1 guided by guide members of the data reproducing apparatus.

Therefore, in the case where the cut surface of the magnetic tape 1 has a large irregular raised and depressed pattern, the guide members of the data recording apparatus or the data reproducing apparatus come into contact with the projected portions of the cut surfaces of the computer data back-up tape 1 when data are recorded or when data are reproduced, whereby there arises a risk of the projected portions of the cut surfaces dropping off the computer data back-up tape 1.

However, in a study done by the inventors of the present invention, it was surprisingly found that in the case where the position where the irregular raised and depressed pattern of the cut surface of the support 2 of the computer data back-up tape 1 on the side of the upper blade 6 obtained by cutting the broad magnetic tape using the upper blade 6 and the lower blade 7 became locally maximal, namely, the position of the upper blade side projection portion 10, or the position where the irregular raised and depressed pattern of the cut surface of the support 2 of the computer data back-up tape 1 on the side of the lower blade 7, namely, the position of the lower blade side projection portion 11, became locally maximal satisfied $40 \leq 100BU/T \leq 70$ or $40 \leq 100BL/T \leq 70$, where BU was the distance from the surface of the back coat layer 5 to the position where the irregular raised and depressed pattern of the cut surface of the support 2 on the side of the upper blade 6, namely, the position of the upper blade side projection portion 10, became locally maximal, BL was the distance from the surface of the back coat layer 5 to the position where the irregular raised and depressed pattern of the cut surface of the support 2 on the side of the lower blade 7, namely, the position of the lower blade side projection portion 11, became locally maximal and T was the total thickness of the computer data back-up tape 1, the position where the irregular raised and depressed pattern of the cut surface of the support 2 on the side of the upper blade 6 became locally maximal, namely, the position of the upper blade side projection portion 10, and the position where the irregular raised and depressed pattern of the cut surface of the support 2 on the side of the lower blade 7 became locally maximal, namely, the position of the lower blade side projection portion 11, substantially coincided with each other in the thickness direction of the computer data back-up tape 1 and as a result, it was possible to abut both cut surfaces of the computer data back-up tape 1 in a similar manner against guide members of a data recording apparatus or guide members of a data reproducing apparatus when both cut surfaces of the computer data back-up tape 1 were guided by the guide members of the data recording apparatus for recording data in the computer data back-up tape 1 or both cut surfaces of the computer data back-up tape 1 were guided by the guide members of the data reproducing apparatus for reproducing data from the computer data back-up tape 1 and thus to enable the computer data back-up tape 1 to run stably, whereby it was possible to effectively prevent a part of the cut surfaces of the computer data back-up tape 1 from peeling off and dropping from the cut surfaces due to the irregular raised and depressed patterns of the cut surfaces of the computer data back-up tape 1 when data were recorded or data were reproduced, even if the cut surfaces of the computer data back-up tape 1 had the irregular raised and depressed patterns. It was further found that the irregular raised and depressed patterns of the cut surfaces of the computer data back-up tape 1 could be controlled by controlling an angle (hereinafter referred to as "cutting start angle") θ between the disk-like upper blade 6 and the disk-like lower blade 7 overlapping each other and rotating in opposite directions at the time that cutting of the broad magnetic tape fed to a portion therebetween was started.

Therefore, in this embodiment, the cutting start angle θ is set so that the position where the irregular raised and depressed pattern of the cut surface of the support 2 of the computer data back-up tape 1 on the side of the upper blade 6 obtained by cutting the broad magnetic tape using the upper blade 6 and the lower blade 7 becomes locally maximal, namely, the position of the upper blade side projection portion 10, or the position where the irregular raised and depressed pattern of the cut surface of the support 2 of the computer data back-up tape 1 on the side of the lower blade 7 becomes locally maximal, namely, the position of the lower blade side projection portion 11, satisfies $40 \leq 100BU/T \leq 70$ or $40 \leq 100BL/T \leq 70$.

As a result, in the computer data back-up tape 1 obtained by cutting the broad magnetic tape using the upper blade 6 and the lower blade 7, the irregular raised and depressed pattern of the cut surface of the support 2 of the computer data back-up tape 1 on the side of the upper blade 6 becomes locally maximal, namely, the position of the upper blade side projection portion 10, and the position where the irregular raised and depressed pattern of the cut surface of the support 2 of the computer data back-up tape 1 on the side of the lower blade 7 becomes locally maximal, namely, the position of the lower blade side projection portion 10, substantially coincide with each other in the thickness direction of the computer data back-up tape 1 and as a result, since it is possible to abut both cut surfaces of the computer data back-up tape 1 in a similar manner against guide members of a data recording apparatus or guide members of a data reproducing apparatus when both cut surfaces of the computer data back-up tape 1 are guided by the guide members of the data recording apparatus for recording data in the computer data back-up tape 1 or both cut surfaces of the computer data back-up tape 1 are guided by the guide members of the data reproducing apparatus for reproducing data from the computer data back-up tape 1 and thus to enable the computer data back-up tape 1 to run stably, whereby it is possible to effectively prevent a part of the cut surfaces of the computer data back-up tape 1 from peeling off and dropping from the cut surfaces due to the irregular raised and depressed patterns of the cut surfaces of the computer data back-up tape 1 when data are recorded or data are reproduced, even if the cut surfaces of the computer data back-up tape 1 have the irregular raised and depressed patterns.

It is preferable for the position where the irregular raised and depressed pattern of the cut surface of the support 2 of the computer data back-up tape 1 on the side of the upper blade 6 obtained by cutting the broad magnetic tape using the upper blade 6 and the lower blade 7 becomes locally maximal, namely, the position of the upper blade side projection portion 10, and the position where the irregular raised and depressed pattern of the cut surface of the support 2 of the computer data back-up tape 1 on the side of the lower blade 7 becomes locally maximal, namely, the position of the lower blade side projection portion 11, to satisfy the relationship that the ratio of BU/T to BL/T is smaller than 0.9 or the ratio of BU/T to BL/T exceeds 1.1 and the cutting start angle θ between the upper blade 6 and the lower blade 7 is set so that the position where the irregular raised and depressed pattern of the cut surface of the support 2 of the computer data back-up tape 1 on the side of the upper blade 6 obtained by cutting the broad magnetic tape using the upper blade 6 and the lower blade 7 becomes locally maximal and the position where the irregular raised and depressed pattern of the cut surface of the support 2 of the computer data back-up tape 1 on the side of the lower blade 7 becomes locally maximal satisfy the relationship that the ratio of BU/T to BL/T is smaller than 0.9 or the ratio of BU/T to BL/T exceeds 1.1, thereby manufacturing the computer data back-up tape 1.

Concretely, the cutting start angle θ between the upper blade 6 and the lower blade 7 is set to be 7 degrees to 12 degrees and preferably, 7 degrees to 10 degrees.

The cutting start angle θ between the upper blade 6 and the lower blade 7 can be set by adjusting the length OL of the region where the upper blade 6 and the lower blade 7 overlap.

WORKING EXAMPLE

Hereinafter, working examples will be set out in order to further clarify the advantages of the present invention.

Working Example 1

A broad magnetic tape was manufactured by forming an under coat layer 3 having a thickness of 2 μm and a magnetic recording layer 4 having a thickness of 0.15 μm on one surface of a broad support 2 made of polyethylene terephthalate and having a width of 500 mm and a thickness of 6.1 μm and forming a back coat layer 5 having a thickness of 0.5 μm on the other surface of the support 2, thereby manufacturing a broad magnetic tape.

Then, the broad magnetic tape was cut using a pair of cutting units 8 each including an upper blade 6 having a diameter of 150 mm and a lower blade 7 having a diameter of 150 mm, thereby manufacturing a computer data back-up tape 1 having a width of 12.65 mm.

An upper blade 6 was employed whose surface facing the lower blade 7 was substantially parallel with the surface of the lower blade 7 facing the upper blade 6 and whose surface opposite from the surface facing the lower blade 7 was an inclined surface formed so that the thickness of the upper blade 6 gradually decreased toward its tip end portion, and the length OL of the region where the upper blade 6 and the lower blade 7 of the pair of cutting units overlapped was varied to vary the cutting start angle θ between the upper blade 6 and the lower blade 7. Then, in each case, irregular raised and depressed patterns of both cut surfaces of the computer data back-up tape 1 manufactured by cutting the broad magnetic tape in the thickness direction of the computer data back-up tape 1 were observed and the position where the irregular raised and depressed pattern of the cut surface of the support 2 on the side of the upper blade 6 became locally maximal and the position where the irregular raised and depressed pattern of the cut surface of the support 2 on the side of the lower blade 7 were measured.

Figure 6:
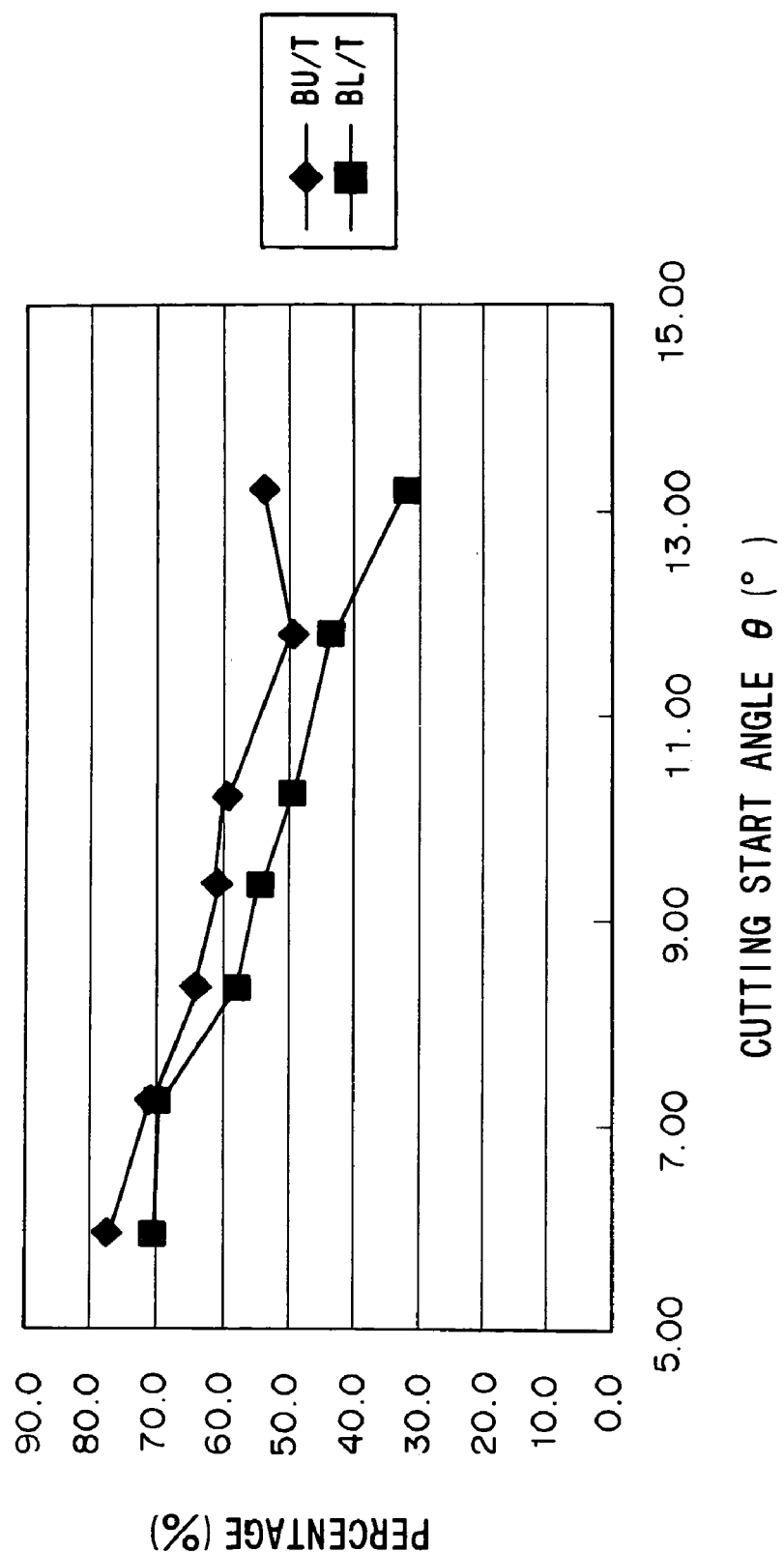
FIG. 6 is a graph showing the relationship between a value (percentage) calculated by dividing the distance BU from the surface of a back coat layer to the position where an irregular raised and depressed pattern of a cut surface of a support on the side of an upper blade becomes locally maximal by the total thickness T of a computer data back-up tape and the cutting start angle θ between the upper blade and a lower blade and the relationship between a value (percentage) calculated by dividing the distance BL from the surface of the back coat layer to the position where an irregular raised and depressed pattern of a cut surface of the support on the side of the lower blade becomes locally maximal by the total thickness T of the computer data back-up tape and the cutting start angle θ between the upper blade and the lower blade.

FIG. 6 is a graph showing the relationship between a value (percentage) calculated by dividing the distance BU from the surface of the back coat layer 5 to the position where the irregular raised and depressed pattern of the cut surface of the support 2 on the side of the upper blade 6 became locally maximal by the total thickness T of the computer data back-up tape 1 and the cutting start angle θ between the upper blade 6 and the lower blade 7 and the relationship between a value (percentage) calculated by dividing the distance BL from the surface of the back coat layer 5 to the position where the irregular raised and depressed pattern of the cut surface of the support 2 on the side of the lower blade 7 became locally maximal by the total thickness T of the computer data back-up tape 1 and the cutting start angle θ between the upper blade 6 and the lower blade 7.

From FIG. 6, it can be seen that the position where the irregular raised and depressed pattern of the cut surface of the support 2 on the side of the upper blade 6 became locally maximal and the position where the irregular raised and depressed pattern of the cut surface of the support 2 on the side of the lower blade 7 became locally maximal varied with the cutting start angle θ between the upper blade 6 and the lower blade 7 and in the case where the value (percentage) calculated by dividing the distance BU from the surface of the back coat layer 5 to the position where the irregular raised and depressed pattern of the cut surface of the support 2 on the side of the upper blade 6 became locally maximal by the total thickness T of the computer data back-up tape 1 was in the range of 40% to 70%, the value (percentage) calculated by dividing the distance BU from the surface of the back coat layer 5 to the position where the irregular raised and depressed pattern of the cut surface of the support 2 on the side of the upper blade 6 became locally maximal by the total thickness T of the computer data back-up tape 1 and the value (percentage) calculated by dividing a distance BL from the surface of the back coat layer 5 to the position where the irregular raised and depressed pattern of the cut surface of the support 2 on the side of the lower blade 7 became locally maximal substantially coincided with each other and therefore, the position where the irregular raised and depressed pattern of the cut surface of the support 2 on the side of the upper blade 6 became locally maximal and the position where the irregular raised and depressed pattern of the cut surface of the support 2 on the side of the lower blade 7 became locally maximal substantially coincided with each other.

Accordingly, it was found that if a computer data back-up tape 1 was manufactured by setting a cutting start angle θ between the upper blade 6 and the lower blade 7 so that the value (percentage) calculated by dividing the distance BU from the surface of the back coat layer 5 to the position where the irregular raised and depressed pattern of the cut surface of the support 2 on the side of the upper blade 6 became locally maximal by the total thickness T of the computer data back-up tape 1 was in the range of 40% to 70% and cutting a broad magnetic tape, since it was possible to abut both cut surfaces of the computer data back-up tape 1 in a similar manner against guide members of a data recording apparatus or guide members of a data reproducing apparatus when both cut surfaces of the computer data back-up tape 1 were guided by the guide members of the data recording apparatus for recording data in the computer data back-up tape 1 or both cut surfaces of the computer data back-up tape 1 were guided by the guide members of the data reproducing apparatus for reproducing data from the computer data back-up tape 1 and thus to enable the computer data back-up tape 1 to run stably, it was possible to effectively prevent a part of the cut surfaces of the computer data back-up tape 1 from peeling off and dropping from the cut surfaces due to the irregular raised and depressed patterns of the cut surfaces of the computer data back-up tape 1 when data were recorded or data were reproduced, even if the irregular raised and depressed patterns were formed on the cut surfaces of the computer data back-up tape 1.

Further, as shown in FIG. 6, it was found that in the case where a computer data back-up tape 1 was manufactured by setting a cutting start angle θ between the upper blade 6 and the lower blade 7 to be 7 degrees to 12 degrees and cutting a broad magnetic tape, the value (percentage) calculated by dividing the distance BU from the surface of the back coat layer 5 to the position where the irregular raised and depressed pattern of the cut surface of the support 2 on the side of the upper blade 6 became locally maximal by the total thickness T of the computer data back-up tape 1 was in the range of 40% to 70% and the value (percentage) calculated by dividing the distance BL from the surface of the back coat layer 5 to the position where the irregular raised and depressed pattern of the cut surface of the support 2 on the side of the lower blade 7 became locally maximal by the total thickness T of the computer data back-up tape 1 was also in the range of 40% to 70%, so that it was preferable to set the cutting start angle θ between the upper blade 6 and the lower blade 7 to be 7 degrees to 12 degrees.

Furthermore, it was found that in the case where a computer data back-up tape 1 was manufactured by setting a cutting start angle θ between the upper blade 6 and the lower blade 7 to be 7 degrees to 10 degrees and cutting a broad magnetic tape, since the position where the irregular raised and depressed pattern of the cut surface of the support 2 on the side of the upper blade 6 became locally maximal and the position where the irregular raised and depressed pattern of the cut surface of the support 2 on the side of the lower blade 7 became locally maximal were much closer and it was possible to abut both cut surfaces of the computer data back-up tape 1 in substantially the same manner against guide members of a data recording apparatus or guide members of a data reproducing apparatus when both cut surfaces of the computer data back-up tape 1 were guided by the guide members of the data recording apparatus for recording data in the computer data back-up tape 1 or both cut surfaces of the computer data back-up tape 1 were guided by the guide members of the data reproducing apparatus for reproducing data from the computer data back-up tape 1 and thus to enable the computer data back-up tape 1 to run stably, it was possible to reliably prevent a part of the cut surfaces of the computer data back-up tape 1 from peeling off and dropping from the cut surfaces due to the irregular raised and depressed patterns of the cut surfaces of the computer data back-up tape 1 when data were recorded or data were reproduced, even if the irregular raised and depressed patterns were formed on the cut surfaces of the computer data back-up tape 1.

Working Example 2

A broad magnetic tape was manufactured by forming an under coat layer 3 having a thickness of 2 μm and a magnetic recording layer 4 having a thickness of 0.15 μm on one surface of a broad support 2 made of polyethylene terephthalate and having a width of 500 mm and a thickness of 6.1 μm and forming a back coat layer 5 having a thickness of 0.5 μm on the other surface of the support 2.

The thus obtained broad magnetic tape was cut using a pair of cutting units 8 each including an upper blade 6 having a diameter of 150 mm and a lower blade having a diameter of 150 mm, thereby manufacturing a computer data back-up tape 1.

Figure 7:
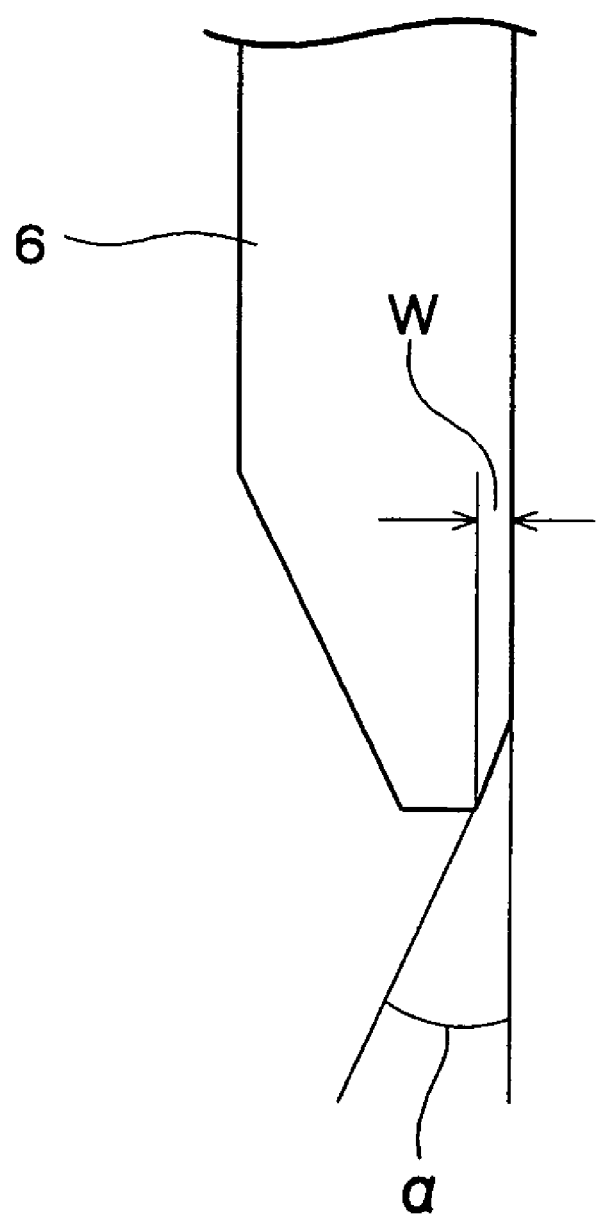
FIG. 7 is a schematic cross-sectional view showing an upper blade and a lower blade.

As shown in FIG. 7, an upper blade 6 was employed whose surface facing the lower blade 7 was chamfered so that the angle between itself and the surface of the lower blade 7 facing the upper blade 6 was 4.5 degrees and that the chamfered width was 0.5 μm and whose surface opposite from the surface facing the lower blade 7 was an inclined surface formed so that the thickness of the upper blade 6 gradually decreased toward its tip end portion, and the length OL of the region where the upper blade 6 and the lower blade 7 of the pair of cutting units overlapped was varied to vary a cutting start angle θ between the upper blade 6 and the lower blade 7. Then, in each case, irregular raised and depressed patterns of both cut surfaces of the computer data back-up tape 1 manufactured by cutting the broad magnetic tape in the thickness direction of the computer data back-up tape 1 were observed and the position where the irregular raised and depressed pattern of the cut surface of the support 2 on the side of the upper blade 6 became locally maximal and the position where the irregular raised and depressed pattern of the cut surface of the support 2 on the side of the lower blade 7 were measured.

As a result, similar results to the case where the upper blade 6 which was not chamfered was employed were obtained.

The present invention has thus been shown and described with reference to specific embodiments and working examples. However, it should be noted that the present invention is in no way limited to the details of the described arrangements but changes and modifications may be made without departing from the scope of the appended claims.

For example, although the above described embodiments were explained with respect to the case of cutting a broad magnetic tape and manufacturing a computer data back-up tape 1, the present invention is not limited to the case of cutting a broad magnetic tape and manufacturing a computer data back-up tape 1 and can be widely applied to cases of cutting a broad magnetic tape and manufacturing a magnetic tape for audio recording, a magnetic tape for video recording, an 8 mm magnetic tape for video recording and the like. Further, the present invention is applicable to not only a magnetic tape having a single magnetic recording layer 4 but also a magnetic tape having a plurality of magnetic recording layer 4.

Further, in the above described embodiment, a broad magnetic tape cut using an upper blade 6 whose surface facing a lower blade 7 is substantially parallel with a surface of the lower blade 7 facing the upper blade 6 and whose surface opposite from the surface facing the lower blade 7 is an inclined surface formed so that the thickness of the upper blade 6 gradually decreases toward its tip end portion, thereby manufacturing a computer data back-up tape 1. However, similarly to Working Example 2, a broad magnetic tape may instead be cut using an upper blade 6 whose surface facing the lower blade 7 is chamfered so that the angle between itself and the surface of the lower blade 7 facing the upper blade 6 is 4.5 degrees and that the chamfered width is 0.5 μm and whose surface opposite from the surface facing the lower blade 7 is an inclined surface formed so that the thickness of the upper blade 6 gradually decreases toward its tip end portion, thereby manufacturing a computer data back-up tape 1.

Furthermore, in Working Example 2, a broad magnetic tape was cut using an upper blade 6 whose surface facing the lower blade 7 was chamfered so that the angle between itself and the surface of the lower blade 7 facing the upper blade 6 was 4.5 degrees and the chamfered width was 0.5 μm and whose surface opposite from the surface facing the lower blade 7 was an inclined surface formed so that the thickness of the upper blade 6 gradually decreased toward its tip end portion, thereby manufacturing a computer data back-up tape 1. However, in the case of using a chamfered upper blade 6, it is not absolutely necessary to employ an upper blade 6 whose surface facing the lower blade 7 is chamfered so that the angle between itself and the surface of the lower blade 7 facing the upper blade 6 is 4.5 degrees and the chamfered width was 0.5 μm.

According to the present invention, it is possible to provide a magnetic tape and a method for manufacturing a magnetic tape which can effectively prevent a part of cut surfaces of a magnetic tape obtained by feeding a broad magnetic tape to a portion between a disk-like upper blade and a disk-like lower blade overlapping each other and rotating in the opposite directions and cutting it along the longitudinal direction thereof from peeling off and dropping from the cut surfaces of the magnetic tape due to irregular raised and depressed patterns of the cut surfaces of the magnetic tape when data are recorded in the magnetic tape or data are reproduced from the magnetic tape.

The invention claimed is:

1. A magnetic tape manufactured by feeding a broad magnetic tape including a broad support, a magnetic recording layer formed on one surface of the broad support and a back coat layer formed on the other surface of the broad support to a portion between a disk-like upper blade and a disk-like lower blade overlapping each other and rotating in opposite directions and cutting it into magnetic tapes each having a predetermined width and in which a position where an irregular raised and depressed pattern of a cut surface of the support on the side of the upper blade becomes locally maximal or a position where an irregular raised and depressed pattern of a cut surface of the support on the side of the lower blade becomes locally maximal satisfies $40 \leq 100BU/T \leq 70$ or $40 \leq 100BL/T \leq 70$, where BU is the distance from the surface of the back coat layer to the position where the irregular raised and depressed pattern of the cut surface of the support on the side of the upper blade becomes locally maximal, BL is the distance from the surface of the back coat layer to the position where the irregular raised and depressed pattern of the cut surface of the support on the side of the lower blade becomes locally maximal and T is the total thickness of the broad magnetic tape and in which a ratio of BU/T to BL/T is equal to or larger than 0.9 and equal to or smaller than 1.1.

2. A magnetic tape manufactured by the method comprising feeding a broad magnetic tape including a broad support, a magnetic recording layer formed on a first surface of the broad support, and a back coat layer formed on a second surface of the broad support, to a portion between a disk-like upper blade and a disk-like lower blade overlapping each other and rotating in opposite directions;

cutting the broad magnetic tape into the magnetic tape in which a first position where a first irregular raised and depressed pattern of a first cut surface of the support on the side of the upper blade becomes locally maximal and a second position where a second irregular raised and depressed pattern of a second cut surface of the support on the side of the lower blade becomes locally maximal satisfies $40 \leq 100BU/T \leq 70$ and $40 \leq 100BL/T \leq 70$, where BU is a first distance from the surface of the back coat layer to the first position, BL is a second distance from the surface of the back coat layer to the second position, and T is a total thickness of the broad magnetic tape.

3. A magnetic tape manufactured by the method comprising:

feeding a broad magnetic tape including a broad support, a magnetic recording layer formed on a first surface of the broad support, and a back coat layer formed on a second surface of the broad support, to a portion between a disk-like upper blade and a disk-like lower blade overlapping each other and rotating in opposite directions;

cutting the broad magnetic tape into the magnetic tape in which a first position where a first irregular raised and depressed pattern of a first cut surface of the support on the side of the upper blade becomes locally maximal or a second position where a second irregular raised and depressed pattern of a second cut surface of the support on the side of the lower blade becomes locally maximal satisfies $40 \leq 100BU/T \leq 70$ or $40 \leq 100BL/T \leq 70$, where BU is a first distance from the surface of the back coat layer to the first position, BL is a second distance from the surface of the back coat layer to the second position, and T is a total thickness of the broad magnetic tape, and the ratio of BU/T to BL/T is equal to or larger than 0.9 and equal to or smaller than 1.1.

4. A magnetic tape in accordance with claim 2 wherein the magnetic tape has a predetermined width.

* * * * *